US009669776B2

(12) United States Patent
Martin

(10) Patent No.: US 9,669,776 B2
(45) Date of Patent: Jun. 6, 2017

(54) ADAPTER PLATE FOR MOUNTING A LICENSE PLATE ONTO A MOTORCYCLE, TRAILER OR THE LIKE

(71) Applicant: Darren Martin, Surrey (CA)

(72) Inventor: Darren Martin, Surrey (CA)

( * ) Notice: Subject to any disclaimer, the term of this patent is extended or adjusted under 35 U.S.C. 154(b) by 25 days.

(21) Appl. No.: 14/569,481

(22) Filed: Dec. 12, 2014

(65) Prior Publication Data

US 2016/0167598 A1    Jun. 16, 2016

(51) Int. Cl.
*G09F 7/00*  (2006.01)
*B60R 13/10*  (2006.01)

(52) U.S. Cl.
CPC .................................. *B60R 13/105* (2013.01)

(58) Field of Classification Search
None
See application file for complete search history.

(56) References Cited

U.S. PATENT DOCUMENTS

| | | | | |
|---|---|---|---|---|
| 2,710,475 A | * | 6/1955 | Salzmann | B60R 13/105 40/202 |
| 4,314,417 A | * | 2/1982 | Cain | B60R 13/105 40/209 |
| 5,027,537 A | * | 7/1991 | Freeman | B60R 13/005 40/209 |
| 2003/0182829 A1 | * | 10/2003 | Simonazzi | B60R 11/00 40/209 |
| 2004/0079009 A1 | * | 4/2004 | Arrua | B60R 13/105 40/204 |
| 2007/0101624 A1 | * | 5/2007 | Records | B60R 13/105 40/209 |
| 2010/0101123 A1 | * | 4/2010 | Pacleb | B60R 13/105 40/209 |

* cited by examiner

*Primary Examiner* — Kristina Junge
(74) *Attorney, Agent, or Firm* — Cameron IP

(57) ABSTRACT

There is provided an adapter plate assembly for mounting a license plate to a connector portion of a vehicle. The assembly includes a rectangular adapter plate having a plurality of spaced-apart protrusions adjacent to respective corners thereof. The protrusions are configured to abut and support the recessed rear of the license plate. The assembly includes a plurality of outer apertures that at least partially extend through the protrusions and align with the outer apertures of the license plate. The assembly includes a plurality of inner apertures extending therethrough. The inner apertures are positioned inwards from the protrusions and align with inner apertures of the connector portion. The assembly includes a plurality of fasteners configured to extend through respective ones of the outer and inner apertures. The license plate couples to the adapter plate and the adapter plate coupling to the connector portion of the vehicle thereby.

13 Claims, 19 Drawing Sheets

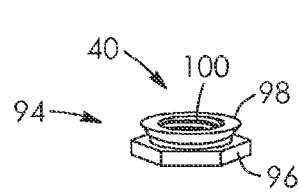
FIG. 7
(PRIOR ART)
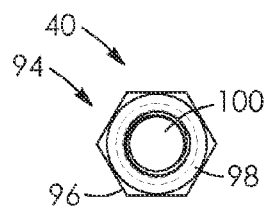
FIG. 8
(PRIOR ART)
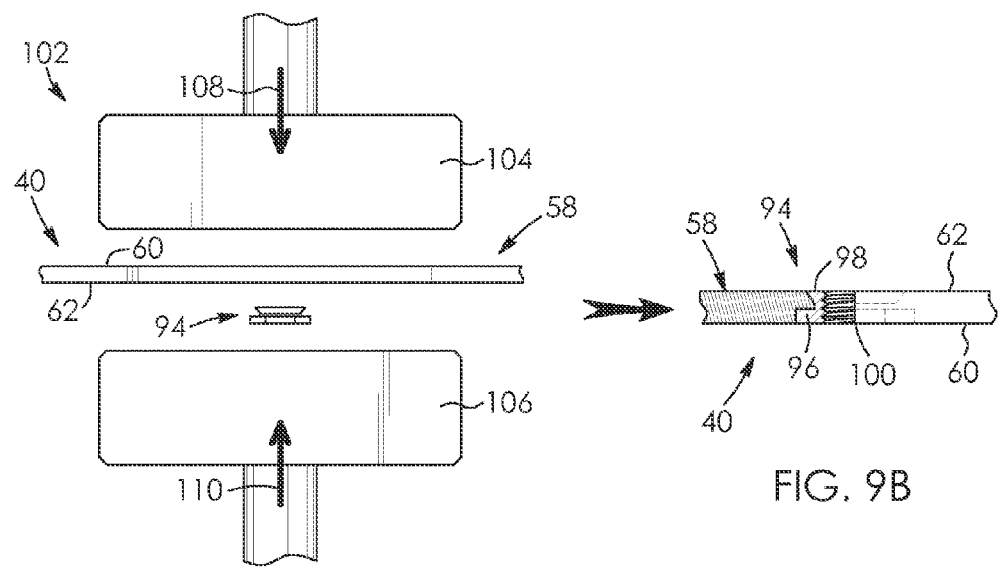
FIG. 9A
FIG. 9B

ADAPTER PLATE FOR MOUNTING A LICENSE PLATE ONTO A MOTORCYCLE, TRAILER OR THE LIKE

FIELD OF THE INVENTION

There is provided an adapter plate. In particular, there is provided an adapter plate for mounting a license place onto a motorcycle, trailer or the like.

DESCRIPTION OF THE RELATED ART

United States Patent Publication No. 2010/0101123 to Pacleb provides a license plate holder for automobiles which allows the maximum viewable area for the plate and offers weather protection. This invention avoids the problem of the license plate frame, tabs and mounting holes covering portions of the plate. The plate is held firmly in the cover even when the plate thickness varies and the cover attaches to the automobile at the back side.

United States Patent Publication No. 2014/0237870 to Eidsmore provides a license plate frame dimensioned for receipt around an associated license plate. The frame includes a first portion in parallel, spaced relation from a second portion and joined thereto along opposite ends by first and second interconnection portions. A handle extends outwardly from a first face of the second portion. First and second spaced openings along the first portion receive associated fasteners to secure the frame to the associated license plate and associated vehicle. First and second spaced-apart, segmented studs (circular or non-circular) extend outwardly from a second face of the second portion for receipt in corresponding openings in the associated license plate, or to abut against an outer surface thereof. The handle includes a first, upper surface and a second, lower surface, the lower surface including a region dimensioned for advertising.

The above systems may require a relatively large number of parts and may be relatively expensive to manufacture. There is accordingly a need for an improved system for mounting a license plate onto a motorcycle, trailer or the like.

BRIEF SUMMARY OF INVENTION

There is provided an adapter plate assembly disclosed herein that overcomes the above disadvantages.

There is accordingly provided an adapter plate assembly for mounting a license plate to a connector portion of a vehicle. The license plate has a recessed rear and a plurality of spaced-apart outer apertures extending therethrough adjacent to corners thereof. The connector portion has a plurality of inner apertures. The assembly includes a rectangular adapter plate having a plurality of spaced-apart protrusions adjacent to respective corners thereof. The protrusions are configured to abut and support the recessed rear of the license plate. The assembly includes a plurality of outer apertures that at least partially extend through the protrusions and align with the outer apertures of the license plate. The assembly includes a plurality of inner apertures extending therethrough. The inner apertures are positioned inwards from the protrusions and align with the inner apertures of the connector portion. The assembly includes a plurality of fasteners configured to extend through respective ones of the outer and inner apertures. The license plate couples to the adapter plate and the adapter plate coupling to the connector portion of the vehicle thereby.

According to another aspect, there is provided an adapter plate assembly for mounting a license plate to a connector portion of a vehicle. The license plate has a recessed rear and a plurality of spaced-apart outer apertures extending therethrough adjacent to corners thereof. The connector portion has a plurality of peripheral apertures. The assembly comprises a rectangular adapter plate having a plurality of spaced-apart protrusions adjacent to respective corners thereof. The protrusions are configured to abut and support the recessed rear of the license plate. The assembly comprises a plurality of threaded, outer apertures that at least partially extend through the protrusions and align with the outer apertures of the license plate. The assembly comprises a pair of connector tabs at peripheral portion thereof. Each of the connector tabs has a peripheral aperture extending therethrough and which aligns with a respective one of the peripheral apertures of the connector portion. The assembly comprises a plurality of fasteners configured to extend through respective ones of the outer and peripheral apertures. The license plate couples to the adapter plate and the adapter plate couples to the connector portion of the vehicle thereby.

According to a further aspect, there is provided an adapter plate for coupling a license plate to a connector portion of a vehicle. The license plate has a recessed rear with a plurality of apertures extending therethrough. The adapter plate is made according to the following process. A metal sheet is formed in a rectangular shape substantially similar to that of a license plate. The next step is causing a plurality of apertures to extend through the sheet at locations corresponding to the apertures of the license plate. The next step is forming a plurality of spaced-apart protrusions in the metal sheet at locations corresponding to the threaded apertures of the metal sheet. The protrusions so formed abut and support the recessed rear of the license plate.

BRIEF DESCRIPTION OF DRAWINGS

The invention will be more readily understood from the following description of preferred embodiments thereof given, by way of example only, with reference to the accompanying drawings, in which:

FIG. 7 is a perspective view of a female threaded connector of the adapter plate assembly;

FIG. 8 is a top plan view thereof;

FIG. 9A is an elevation view of a metal sheet and the connector of FIG. 7 positioned within a press assembly according to one aspect for embedding the connector within the sheet;

FIG. 9B is an elevation view partially in cross-section of the sheet of FIG. 9A, with the connector embedded within the sheet and being shown partially in cross-section;

DESCRIPTION OF THE PREFERRED EMBODIMENTS

Figure 1:
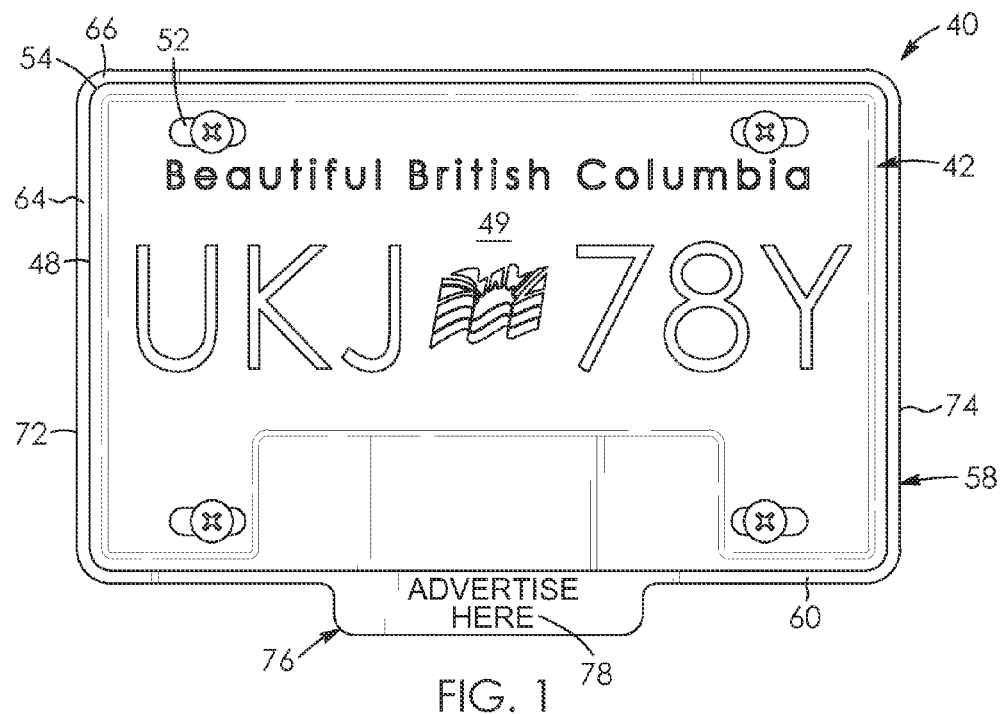
FIG. 1 is a front elevation view of an adapter plate assembly according to a first aspect, and a license plate connected thereto.
Figure 11:
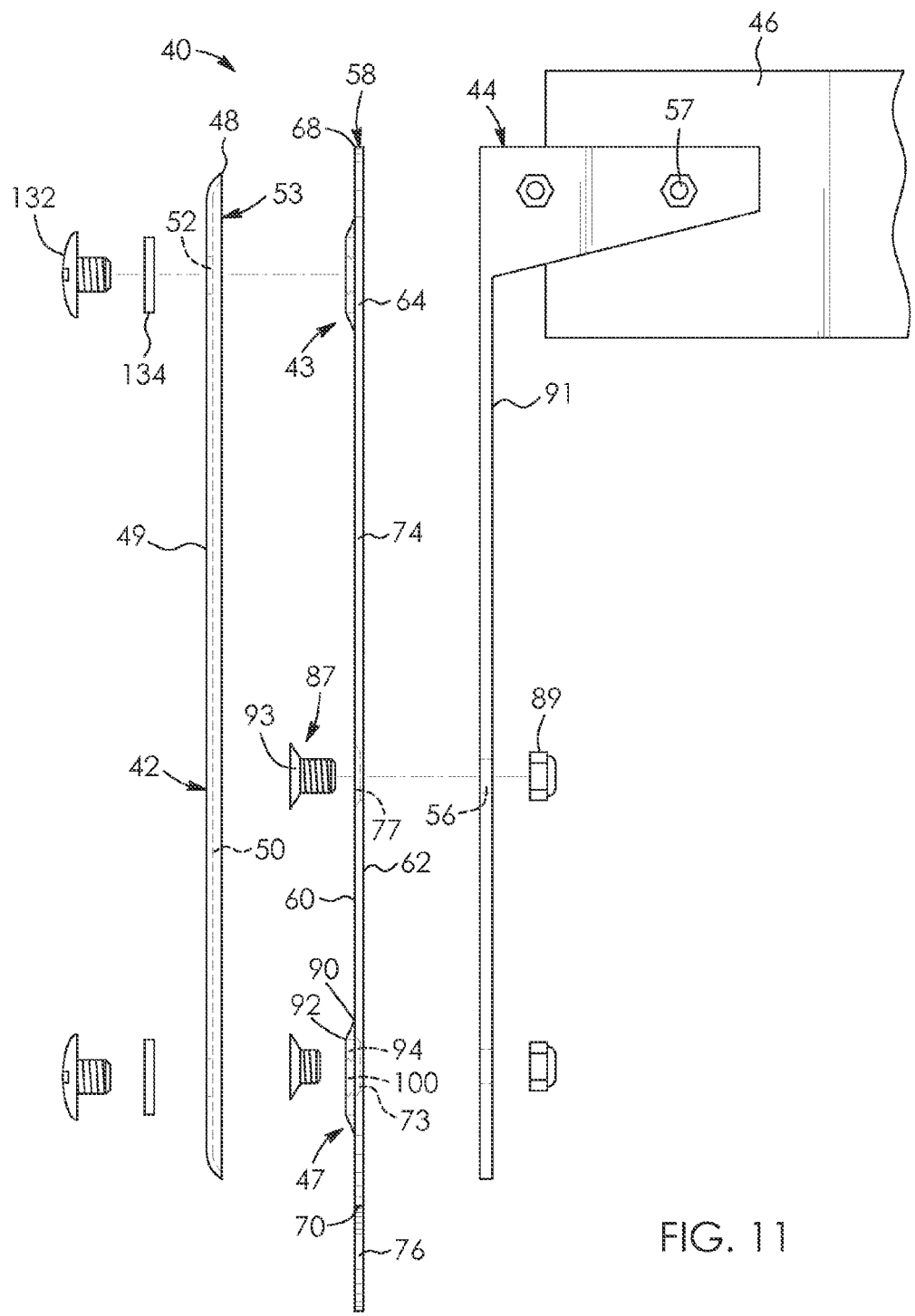
FIG. 11 is an exploded, side elevation view of the license plate and the adapter plate assembly of FIG. 1, a bracket of a vehicle according to one aspect and a fragmented portion of said vehicle.

Referring to the drawings and first to FIG. 1, there is shown an adapter plate assembly 40 for mounting a license plate 42 to a connector portion, in this example a bracket 44 of a vehicle 46, seen in FIG. 11. The vehicle may be a motorcycle or a trailer, for example, and is shown in fragment.

Figure 2:
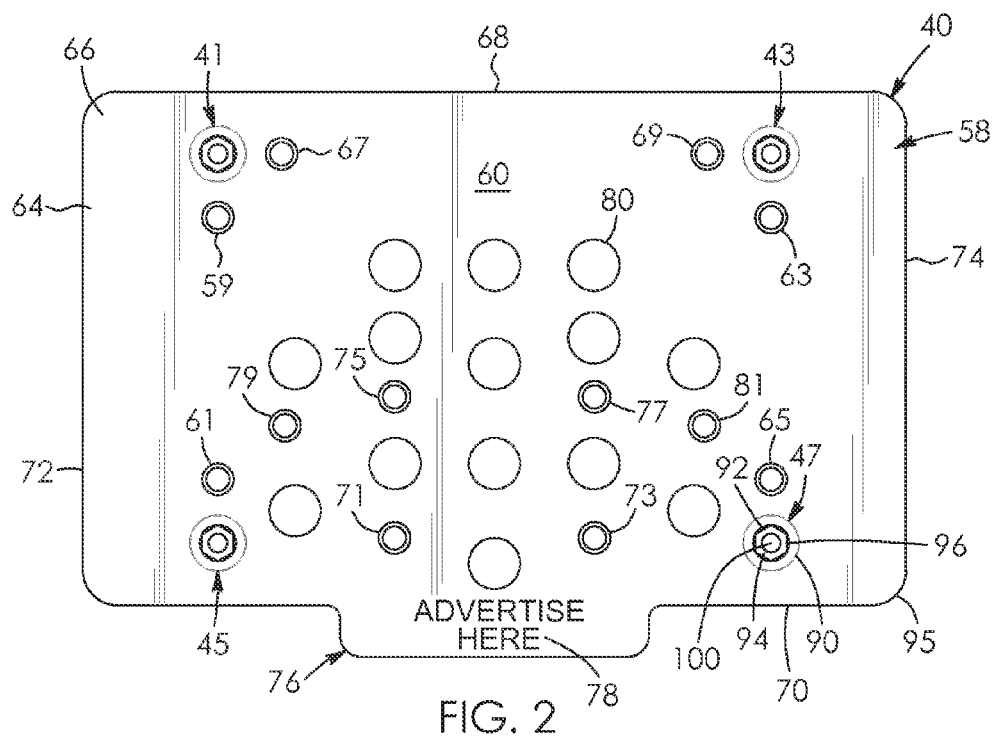
FIG. 2 is a front elevation view of the adapter plate assembly.

As seen in FIGS. 1 and 2, the license plate is generally rectangular and has a peripheral rim portion 48. Referring to FIG. 11, the license plate 42 has a front 49 and a recessed rear 50 opposite the front. The recessed rear is centrally-located relative to the rim portion. The rim portion 48 and rear 50 of the license plate 42 form a recessed interior region 53. The license plate has a plurality of corners and a plurality of spaced-apart outer apertures extending therethrough adjacent to corners thereof, as seen by aperture 52 positioned adjacent to corner 54 in FIG. 1. The license plate, including its various parts and functions, is conventional.

As seen in FIG. 11, the bracket 44 has a plurality of inner or peripheral apertures extending therethrough, as shown by aperture 56. The bracket couples to the vehicle 46 in a conventional manner, in this example via bolts 57.

Figure 3:
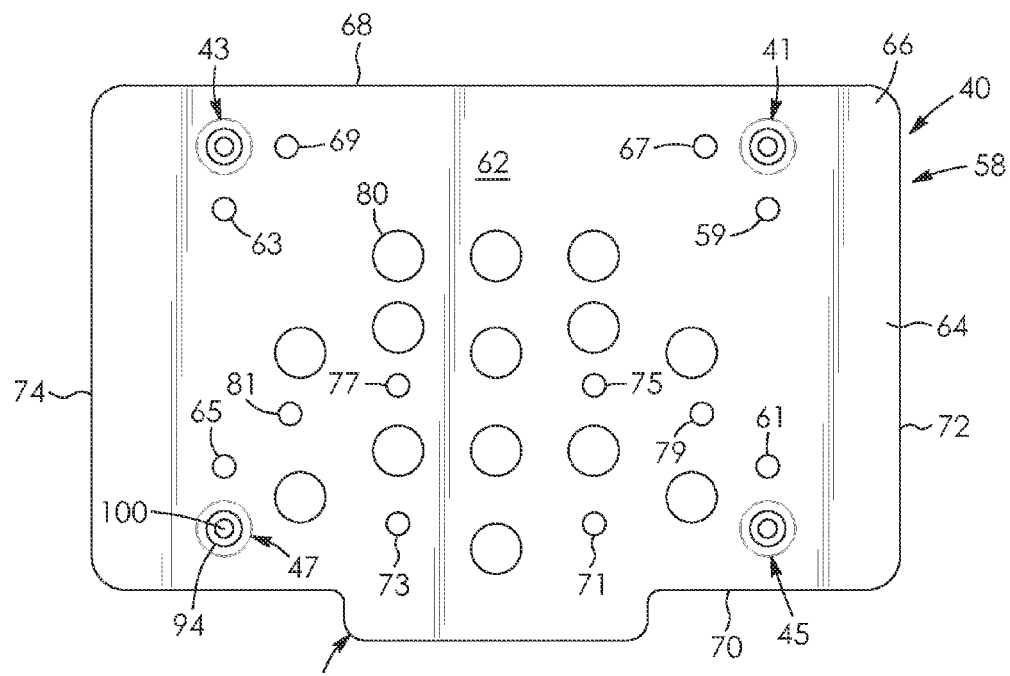
FIG. 3 is a rear elevation view thereof.
Figure 4:
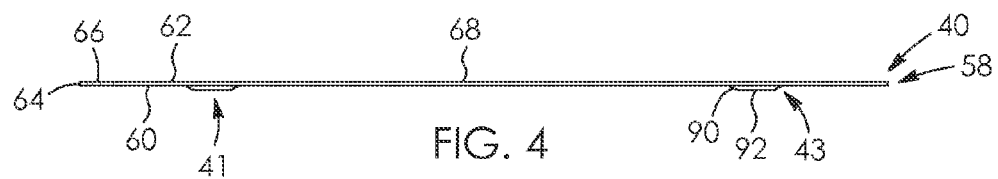
FIG. 4 is a top plan view thereof.
Figure 5:
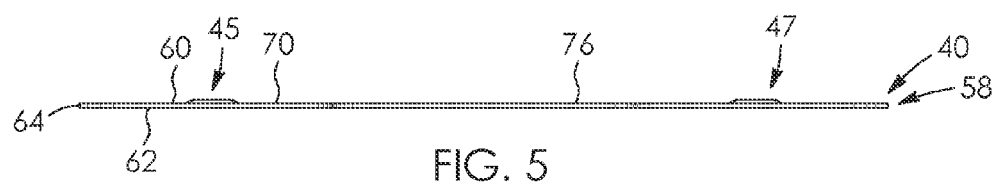
FIG. 5 is bottom plan view thereof.

As seen in FIG. 2, the adapter plate assembly 40 comprises a rectangular adapter plate 58 that is made of aluminum sheet in this example. However, this is not strictly required and the plate need not be made of aluminum and may be made of other materials in other examples. The adapter plate 58 has a front 60 which faces the recessed rear 50 of the license plate 42 seen in FIG. 11. As seen in FIG. 3, the adapter plate 58 has a rear 62 which faces the bracket 44 seen in FIG. 11. The front and rear of the adapter plate are generally rectangular in this example, with each having an area substantially equal to or greater than that of the license plate 42. The adapter plate 58 has a peripheral portion 64, seen in FIG. 1, which aligns with, is outwardly spaced-apart from and extends around the peripheral rim portion 48 of the license plate 42. The adapter plate has a plurality of corners, in this example four corners, that correspond to and align with the corners of the license plate, as seen in FIG. 1 by corner 66 of adapter plate 58 aligning with corner 54 of the license plate. As seen in FIG. 2, the adapter plate has a top 68, bottom 70 spaced-apart from its top, a first side 72 and a second side 74 which is opposite its first side. The sides of the adapter plate extend between the top and bottom thereof.

As seen in FIG. 2, the adapter plate assembly 40 includes a display tab 76 which in this example extends downwards from the bottom 70 of the adapter plate 58. The display tab is generally rectangular in shape in this example and centrally positioned between sides 72 and 74 of the plate 58. The display tab is configured to receive advertising and the like thereon, as indicated by the indicia "ADVERTISE HERE" indicated by numeral 78 and shown in FIGS. 1 and 2. In other embodiments, the tabs may have different shapes and could be in other positions such as the top of the plate 58.

The adapter plate 58 includes a plurality of auxiliary apertures extending therethrough, as shown by aperture 80, positioned between the top 68 and bottom 70 and sides 72 and 74 of the plate. These auxiliary apertures may function to save weight by reducing the amount of metal or other material that may otherwise be needed to form the plate 58.

As seen in FIG. 2, the adapter plate 58 includes a plurality of inner apertures extending therethrough. These include: a first pair of apertures 59 and 61 that are aligned in a first column and positioned adjacent to side 72 of plate 58; a second pair of apertures 63 and 65 that are aligned in a second column and positioned adjacent to side 74 of plate 58; a third pair of apertures 67 and 69 that are aligned in a first row and positioned adjacent to top 68 of plate 58; a fourth pair of apertures 71 and 73 that are aligned in a second row and positioned adjacent to bottom 70 of plate 58; a fifth pair of apertures 75 and 77 that are aligned in a third row and interposed between the top and bottom of the plate; and a sixth pair of apertures 79 and 81 that are aligned in a fourth row and interposed between apertures 75 and 77 and bottom 70 of the plate 58.

Apertures 67 and 79 align in parallel with side 72 of plate 58 in this example and apertures 69 and 81 align in parallel with side 74 of the plate in this example. Apertures 67, 69, 79 and 81 are arranged so as to form a first rectangular arrangement in this example. Apertures 59 and 61 align in parallel with side 72 of plate 58 in this example and apertures 63 and 65 align in parallel with side 74 of the plate in this example. Apertures 59, 61, 63 and 65 are arranged so as to form a second rectangular arrangement in this example. Apertures 71 and 75 align in parallel with side 72 of plate 58 in this example and apertures 73 and 77 align in parallel with side 74 of the plate in this example. Apertures 71, 73, 75 and 77 are arranged so as to form a third rectangular arrangement in this example. Each of the inner apertures 59, 61, 63, 65, 67, 69, 71, 73, 75, 77, 79 and 81 is tapered inwardly in a direction extending from the front 60 to the rear 62 of the adapter plate in this example, as seen by apertures 73 and 77 in FIG. 11.

Figure 12:
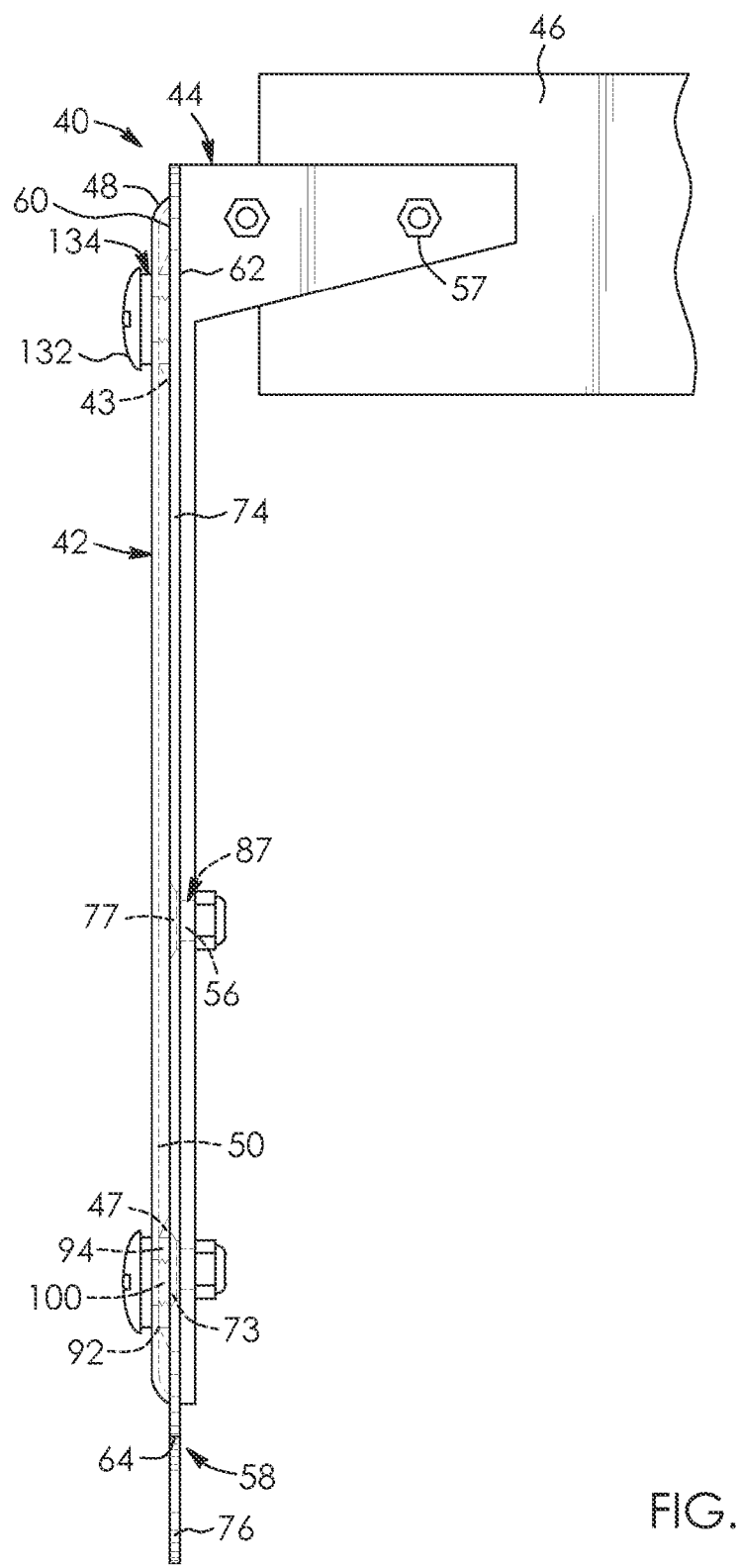
FIG. 12 is a side elevation view of the license plate, adapter plate assembly, bracket and fragmented portion of the vehicle of FIG. 11, the license plate, adapter plate assembly, bracket and fragmented portion being shown coupled together in assembled form.

The inner apertures 86 of the adapter plate 58 are configured to align with respective peripheral apertures 56 of the bracket 44, as seen in FIG. 11. The adapter plate 58 is selectively connectable to the bracket via a plurality of fasteners, which in this example are countersunk bolts 87, shown in FIG. 11, which partially extend through apertures 77. The bolts may be secured in place via nuts 89 which may abut the rear 91 of bracket 44 and threadably couple to the bolts. The use of countersunk bolts and tapered apertures 77 ensures that the heads 93 of the bolts 87 are flush with front 60 of plate 58 when the plate is so connected to the bracket as seen in FIG. 12.

Figure 6:
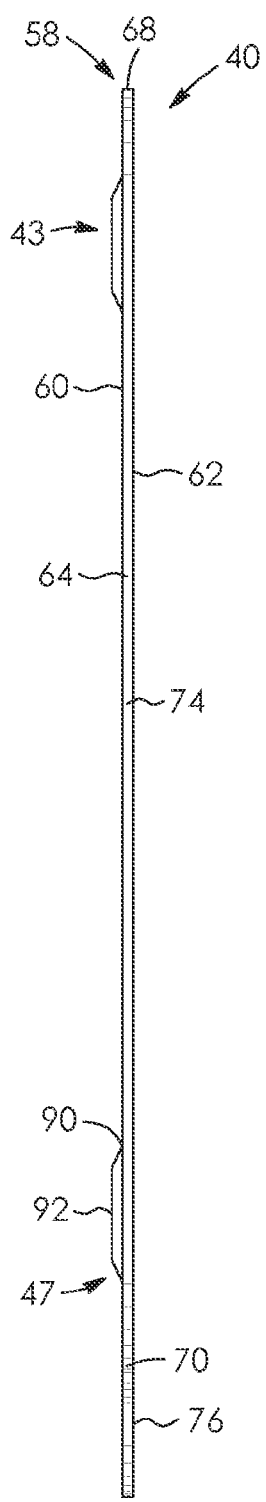
FIG. 6 is a right side view of the adapter plate assembly of FIG. 2, with the left side view being a mirror image thereof.

The adapter plate assembly 40 includes a plurality of spaced-apart protrusions 41, 43, 45 and 47 adjacent to respective ones of the corners of plate 58, as seen in FIG. 2 by protrusion 47 at corner 95. The protrusions are embossments of the adapter plate in this embodiment and are frustoconical in this example. As seen in FIG. 6, each of the protrusion 47 has a proximal end 90 coupled to and adjacent to the front 60 of the plate 58. Each protrusion has a distal end 92 spaced-apart from its proximal end and spaced-apart from the front of the plate. As seen in FIG. 2, protrusions 41 and 45 align in a first column adjacent to side 72 of plate 58. Protrusions 43 and 47 align in a second column which is spaced-apart from the first column and which is adjacent to side 74 of the adapter plate in this example. Protrusions 41 and 43 align in a first row adjacent to top 68 of plate 58. Protrusions 45 and 47 align in a second row which is spaced-apart from the first row and which is adjacent to bottom 70 of the adapter plate.

Pair of inner apertures 59 and 61 are interposed between and align with the first column of protrusions 41 and 45 in this example. Pair of inner apertures 63 and 65 are interposed between and align with the second column of the protrusions 43 and 47 in this example. Pair of inner apertures 67 and 69 are interposed between and align with the first row of protrusions 41 and 43. Pair of inner apertures 71 and 73 are interposed between and align with the second row of protrusions 45 and 47.

The inner apertures may be said to comprise the following four pairs each of which aligns adjacent to a respective one of the protrusions: apertures 59 and 67 aligning diagonal and adjacent to protrusion 41; apertures 63 and 69 aligning diagonal and adjacent to protrusion 43; apertures 61 and 79 aligning diagonal and adjacent to protrusion 45; and apertures 65 and 81 aligning diagonal and adjacent to protrusion 47.

FIGS. 7 to 10 show how the protrusions are formed in the plate 58 according to one preferred embodiment. The adapter plate 58 is first formed in a rectangular shape substantially similar to that of a license plate as seen in FIG. 2. Next, a plurality of female threaded connectors, in this example self-clinching flush fasteners such as a Pemsert® are selected, as seen by connector 94 seen in FIGS. 7 and 8. Each fastener in this example includes an annular, hexagonal top portion 96, a flanged bottom portion 98 coupled thereto and a threaded aperture 100 extending therethrough from the top portion through to the bottom portion. Pemsert® fasteners are off-the-shelf products which may be purchased at PennEngineering, having an office at 5190 Old Eston Rd., Danboro, Pa. 18916. The connectors are made of steel in this example, though this is not strictly required and they may be made of materials in other embodiments. Their various parts and features are known to those skilled in the art and therefore will not be described in further detail.

Referring to FIG. 9A, plate 58 and respective connectors 94 are next positioned within a press assembly 102. The press assembly includes a pair of platens 104 and 106 between which the plate 58 and connector are pressed, as shown by movement arrows 108 and 110. Press assemblies per se, including their various parts and functionings, are known to those skilled in the art and therefore will not be described in further detail.

During this process, the connectors are aligned so as to correspond to locations of respective apertures 52 of the license plate 42 seen in FIG. 1. The pressing causes the connectors 94 to become embedded within the plate 58 with the top portions 96 of the connectors 94 aligning with the front 60 of the plate and the bottom portions 98 of the connectors aligning with the rear 62 of the plate, as seen in FIG. 9B. In this manner, the adapter plate assembly 40 is provided with a plurality of threaded, outer apertures 100 which align with the outer apertures 52 of the license plate 42 seen in FIG. 1.

Figures 10A, 10B:
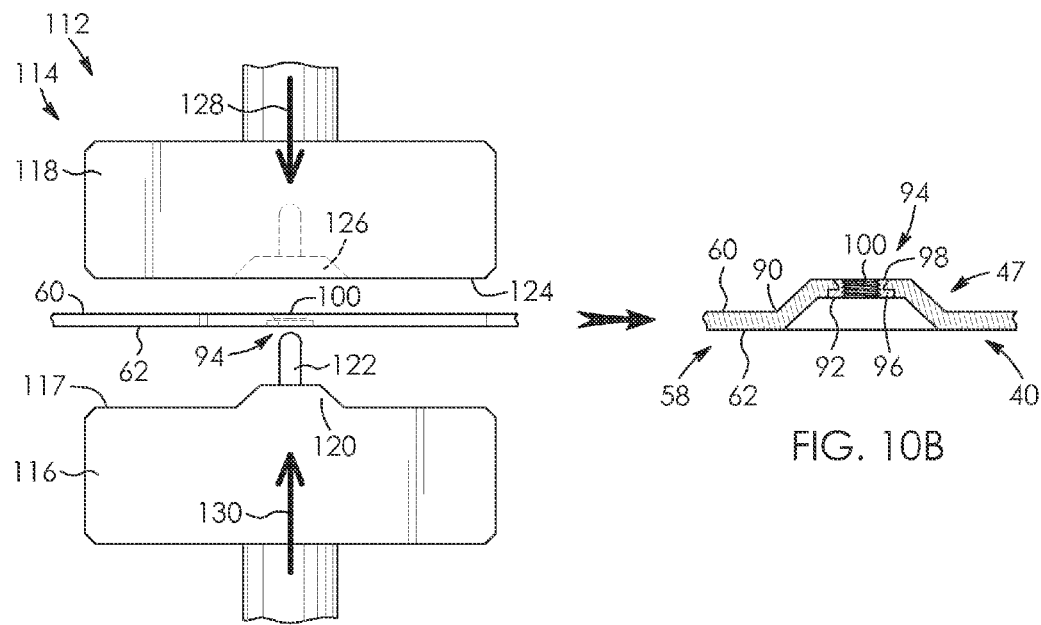
FIG. 10A is an elevation view of the metal sheet so embedded with a connector, the sheet and connector being shown in cross-section, said sheet being positioned between embossment tools for forming a protrusion within the sheet at the location of the connector thereby, the sheet being shown in fragment.
FIG. 10B is a cross-sectional elevation view of the metal sheet of FIG. 10A with the protrusion formed thereafter, the sheet being shown in fragment.

The protrusions are next formed by an embossment assembly 112 seen in FIG. 10A. The embossment assembly comprises an embossing tool 114 comprising a male member and a corresponding female member, in this example in the form of a pair of tool bits 116 and 118. Tool bit 116 has a substantially planar surface 117 for abutting the rear 62 of the plate 58. The bit has a frustoconical portion 120 extending outwards from planar surface 117 and a centrally-disposed pin 122 extending outwards from the frustoconical portion. The pin is shaped to selectively extend through the apertures 100. The extent to which frustoconical portion extends outwards corresponds to the desired amount of outward extension of the distal end 92 of the protrusion 47 relative to front 60 of the plate 58.

Tool bit 118 has a corresponding substantially planar surface 124 shaped to abut front 60 of the plate 58. The bit further has a recessed portion 126 which is complementary in shape to the frustoconical portion 120 and pin 122 of bit 116 so as to receive them. The pin 122 is then aligned with aperture 100, and the bits 116 and 118 are then pressed together, as shown by movement arrows 128 and 130. This causes respective protrusions 47 to be formed, as seen in FIG. 10B.

Referring to FIGS. 11 and 12, the protrusions 47 so formed are shaped to abut and support the recessed rear 50 of the license plate 42. The protrusions are shaped such that when their distal ends 92 thereof abut the recessed rear of the license plate, the peripheral portion 64 of the adapter plate 58 abuts and aligns with the peripheral rim portion 48 of the license plate, as seen in FIGS. 1 and 12.

As seen in FIG. 11, the adapter plate assembly 40 includes a plurality of fasteners 132 configured to extend through respective apertures 52 of the license plate 42 and apertures 100 of the protrusions 47 for coupling to the license plate to the adapter plate in a flush and secure manner. The assembly 40 may further include washers 134 interposed between the fasteners 132 and the front 49 of the license plate 42.

Figure 13:
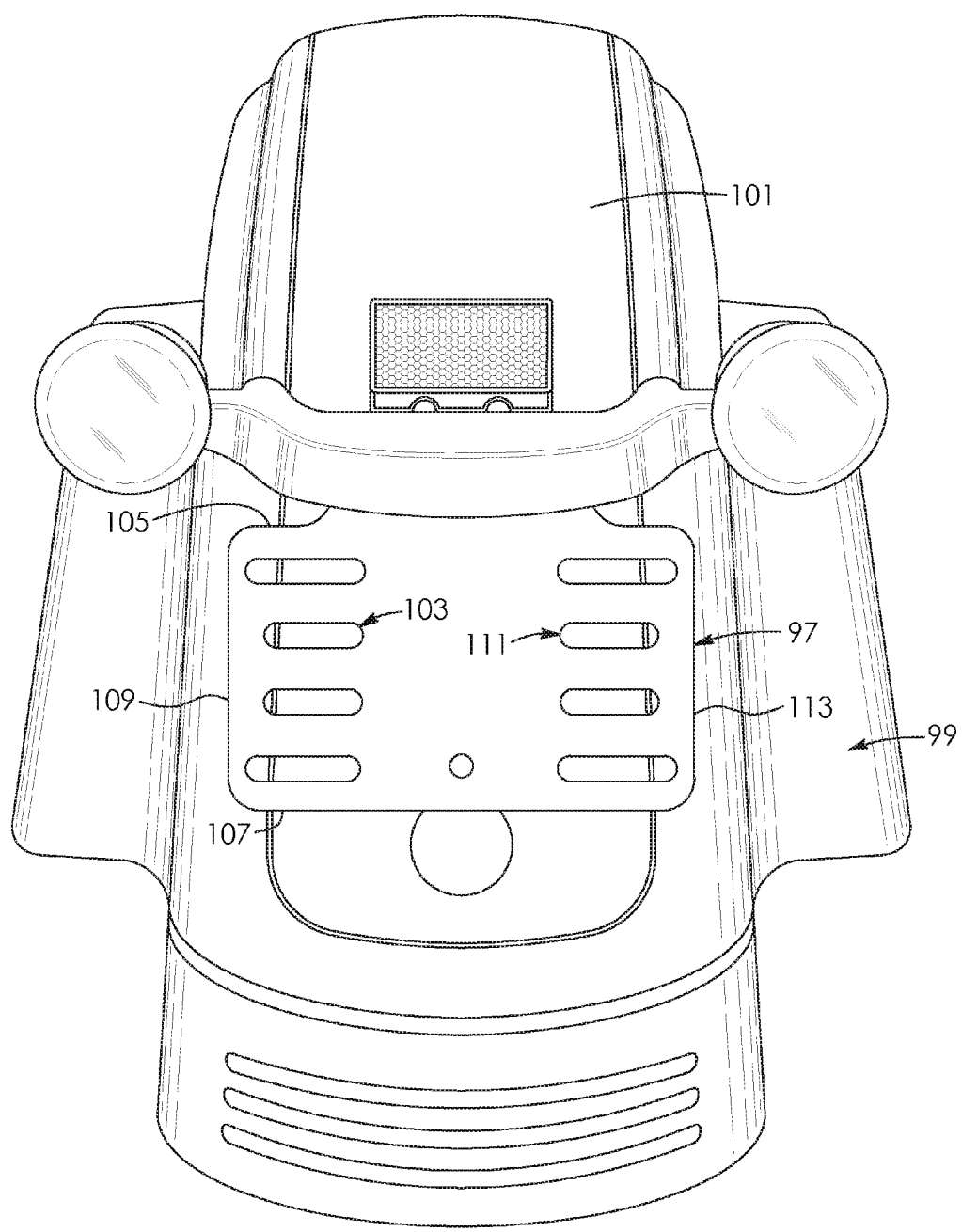
FIG. 13 is front elevation view of a bracket for a rear portion of a vehicle, the rear portion of the vehicle, the bracket being according to a second aspect.

FIG. 13 shows an off-the-shelf bracket 97 suitable for some American license plates (not shown) for connecting thereto. The bracket couples to a rear portion 99 of a motorcycle 101. The bracket 97 in this example has a first plurality of spaced-apart slots extending therethrough, as shown by slot 103, which extend from the top 105 to the bottom 107 of the bracket adjacent to a first side 109 thereof. The bracket has a second plurality of spaced-apart slots extending therethrough, as shown by slot 111, which extend from the top 105 to the bottom 107 of the bracket adjacent to a second side 113 thereof. Bracket 97 may be too small for license plates in other jurisdictions, such as various provinces of Canada.

Figure 14:
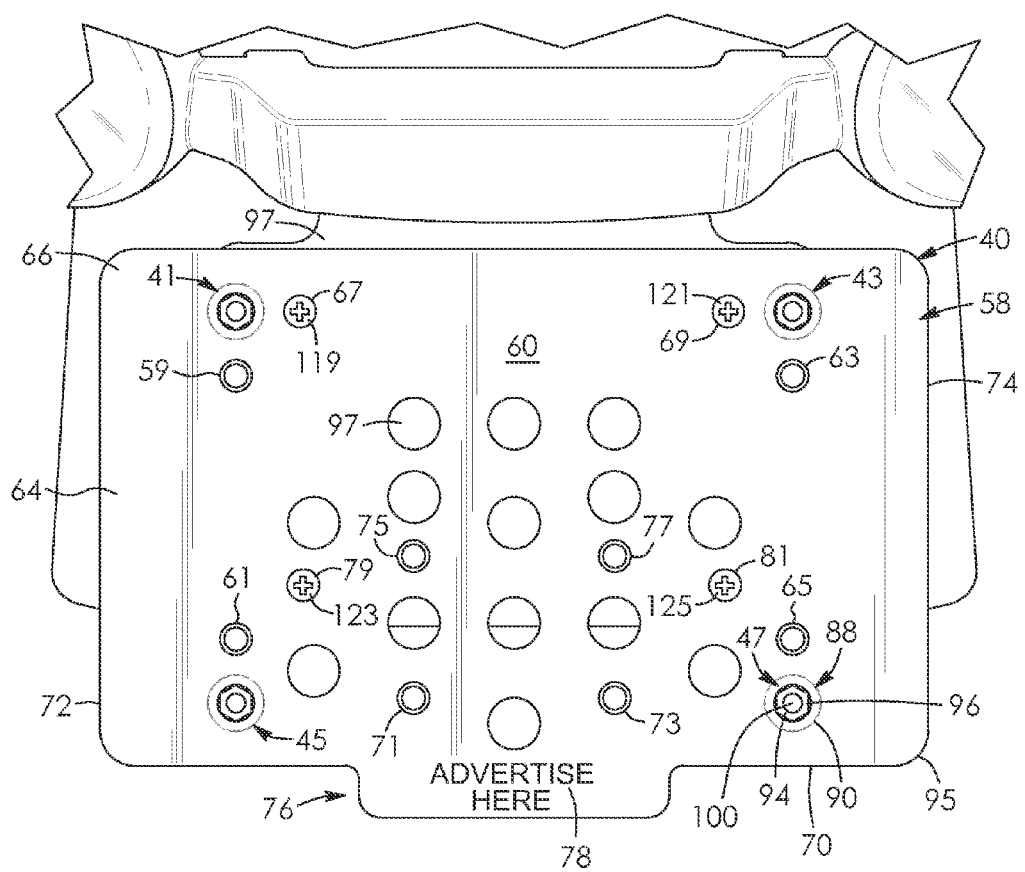
FIG. 14 is a front elevation view of the adapter plate assembly of FIG. 2 coupled to the bracket of FIG. 13.

As seen in FIG. 14, fasteners 119 and 121 extend through upper apertures 67 and 69, respectively, of plate 58 and upper ones of the plurality of slots 103 and 111, and fasteners 123 and 125 extend through lower apertures 79 and 81 of the adapter plate and lower ones of the plurality of slots 103 and 111 to couple the adapter plate to bracket 97 thereby. The adapter plate so connected may thereafter thus enable a larger license plate, for example, to be threadably connected to the adapter plate via protrusions 41, 43, 45 and 47 in a manner otherwise substantially the same as that described for FIGS. 11 and 12.

Figure 15:
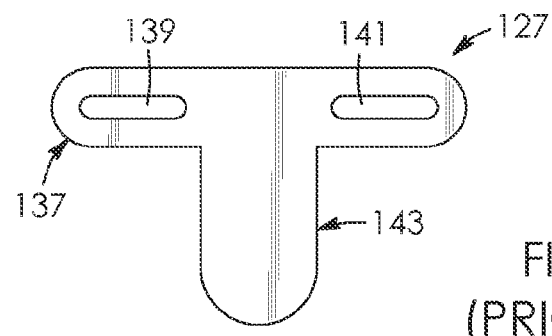
FIG. 15 is a front elevation view of a bracket for a rear portion of a vehicle, the bracket being according to a third aspect.

FIG. 15 shows an off-the-shelf bracket 127 suitable for some American license plates (not shown) for connecting thereto, the bracket being T-shaped in this example. The bracket couples to rear portion 99 of motorcycle 101 seen in FIG. 16. Referring to FIG. 15, the bracket 127 in this example has a horizontally-extending upper portion 137, two spaced-apart slots 139 and 141 which extend through said upper portion, and a centrally-disposed vertically-extending portion 143 coupled to and extending downwards from portion 137. Here too bracket 127 may be either too small for license plates in other jurisdictions, such as various provinces of Canada, and/or may inadequately support the license plate, leading to bending of the corners thereof.

Figure 16:
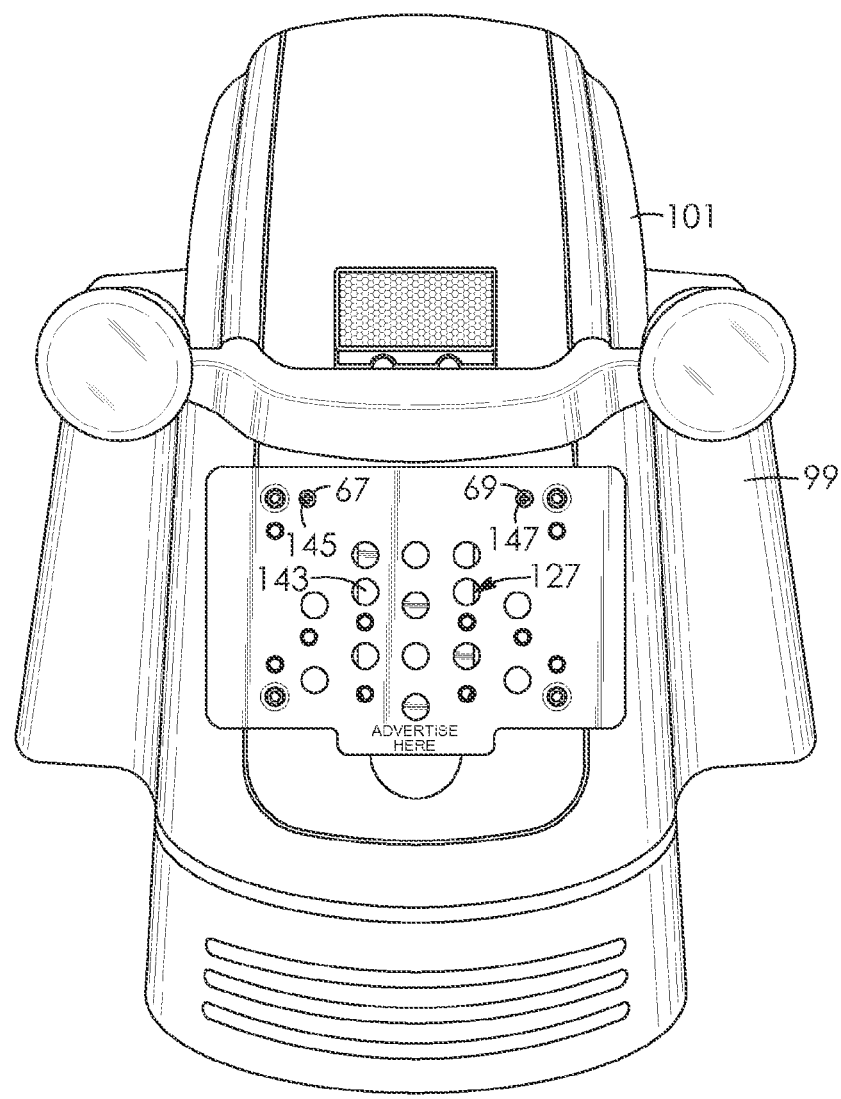
FIG. 16 is a front elevation view of the adapter plate assembly of FIG. 2 coupled to the bracket of FIG. 15.

As seen in FIG. 16, fasteners 145 and 147 extend through upper apertures 67 and 69, respectively, of plate 58 and slots 139 and 141, seen in FIG. 15, respectively, to couple the adapter plate 58 to bracket 127 thereby. In this manner, the adapter plate so connected may thereafter thus enable a license plateto be threadably connected to the adapter plate via protrusions 41, 43, 45 and 47 in a manner which may better support the license plate and as otherwise substantially the same as that described for FIGS. 11 and 12.

Figures 17A, 17B:
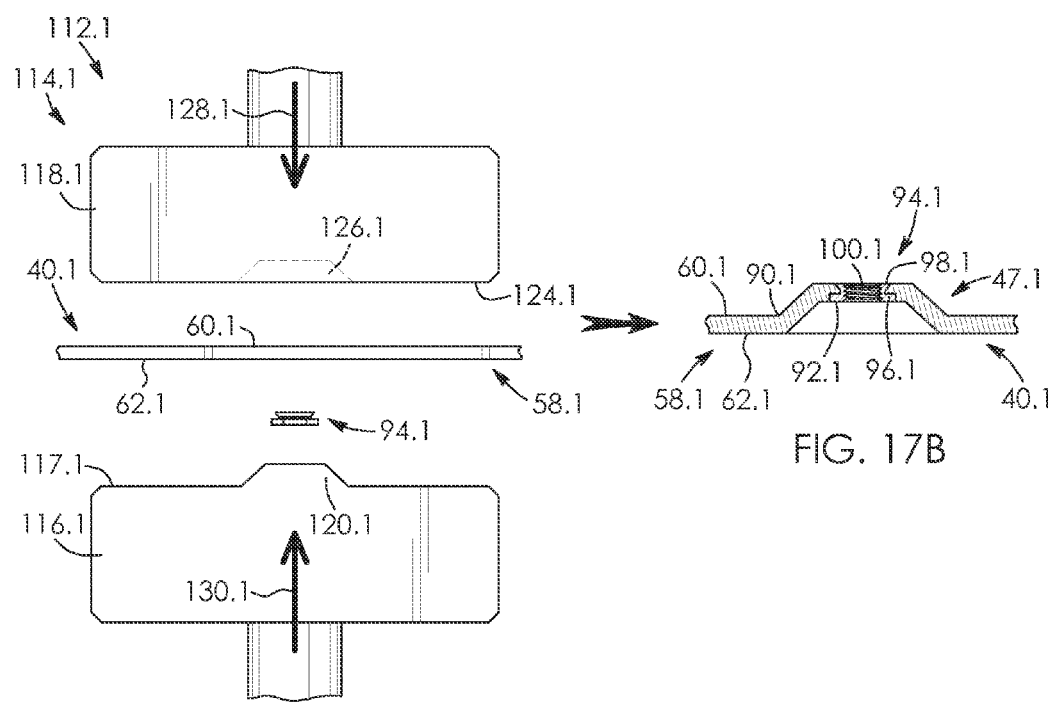
FIG. 17A is an elevation view of a metal sheet and the connector of FIG. 7 positioned within a press assembly according to a further aspect for embedding the connector within the sheet.
FIG. 17B is a cross-sectional elevation view of the sheet of FIG. 17A, with the connector embedded within the sheet and being shown partially in cross-section.

FIGS. 17A and 17B show a process for forming the adapter plate of FIGS. 1 to 16. Like parts have like numbers and functions as the adapter plate assembly 40 and process shown in FIGS. 1 to 16 with the addition of decimal extension ".1". Adapter plate assembly 40.1 is formed in a substantially similar manner to that shown in FIGS. 9A to 10B with the following exceptions. In this example, connectors 94.1 are pressed between bits 116.1 and 118.1 and a metal sheet, or sheet metal, so as to embed the connectors within plate 58.1 while also forming protrusions 47.1 within the same step. This may thus function to reduce the amount of steps required to produce adapter plate 58.1.

FIGS. 18 to 23 show an adapter plate assembly 40.2 according to a second aspect. Like parts have like numbers and functions as the adapter plate assembly 40 shown in FIGS. 1 to 16 with the addition of decimal extension ".2". Adapter plate assembly 40.2 is substantially the same as adapter plate assembly 40 shown in FIGS. 1 to 16 with the following exceptions.

Figure 23:
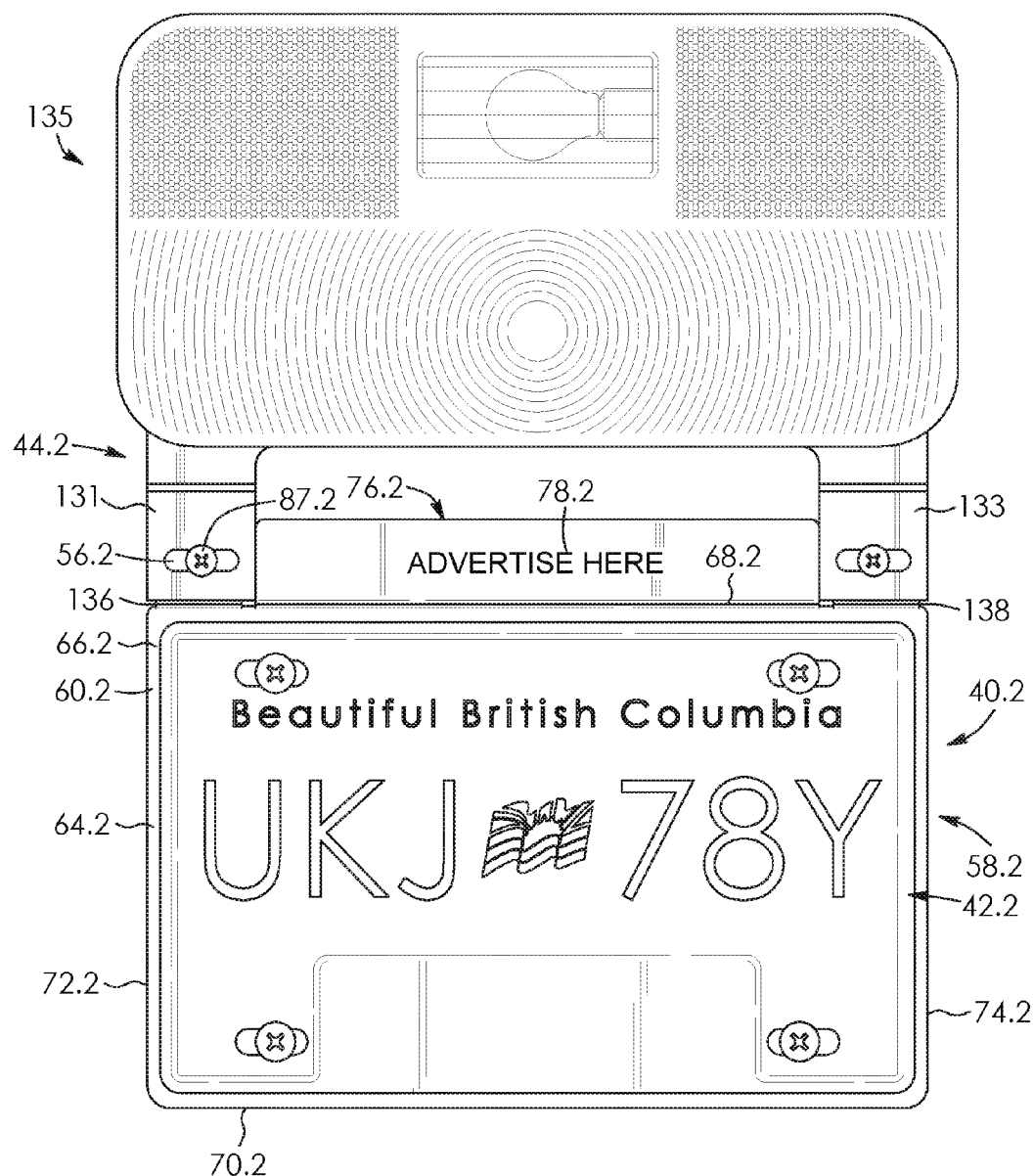
FIG. 23 is a front elevation view of the adapter plate assembly of FIG. 18, a license plate connected thereto, and a light assembly for a vehicle, the adapter plate assembly having a pair of spaced-apart connector tabs and the light assembly being shown coupled to the connector tabs thereof.
Figure 24:
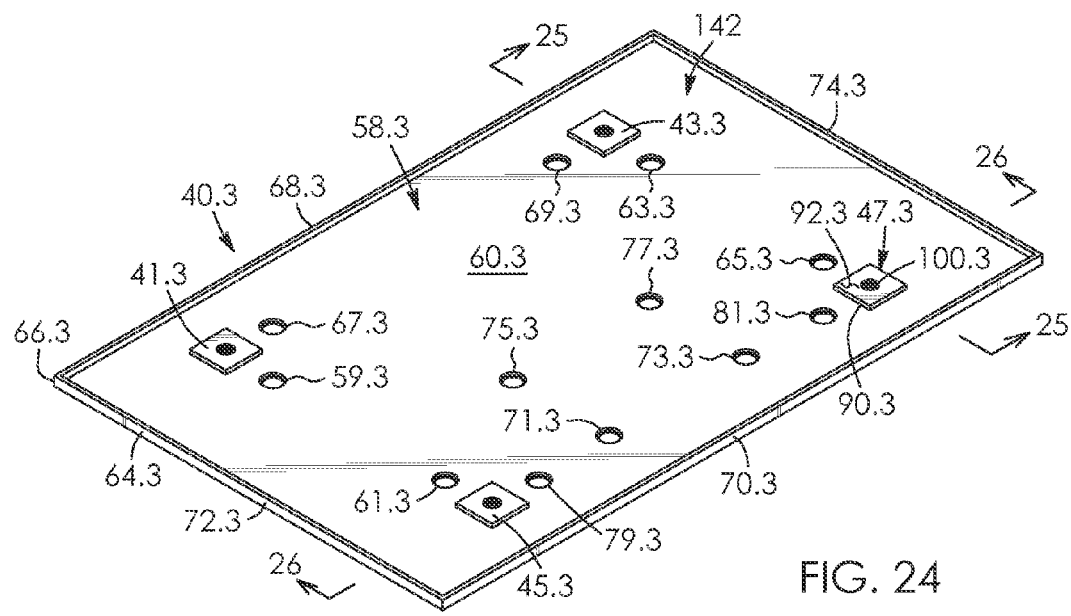
FIG. 24 is a perspective view of an adapter plate assembly according to a third aspect.
Figure 25:
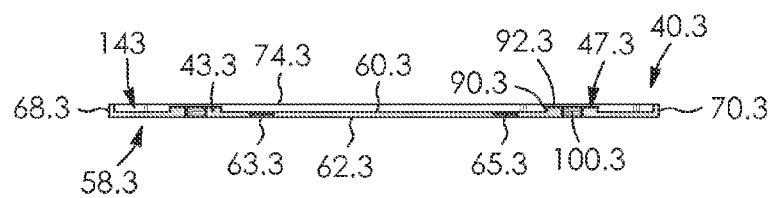
FIG. 25 is a cross-sectional view of the adapter plate assembly of FIG. 24 taken along lines 25-25 thereof.
Figure 26:
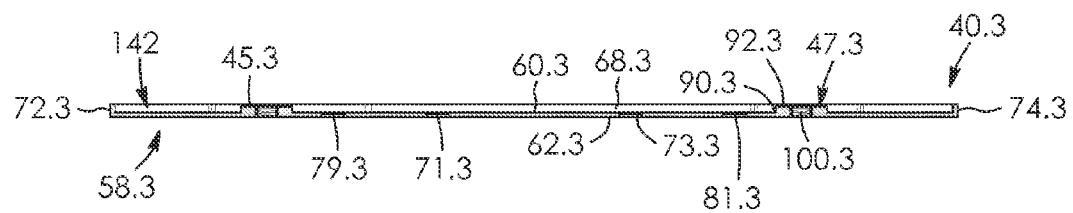
FIG. 26 is a cross-sectional view of the adapter plate assembly of FIG. 24 taken along lines 26-26 thereof.
Figure 27:
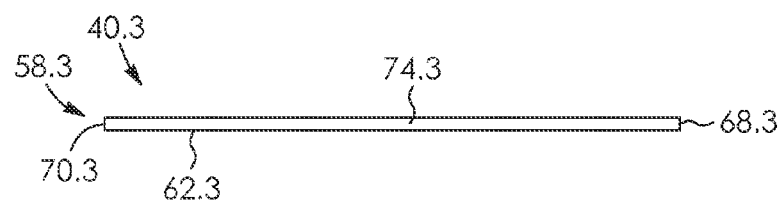
FIG. 27 is a right side view of the adapter plate assembly of FIG. 24, with the left side being a mirror image thereof.
Figure 28:
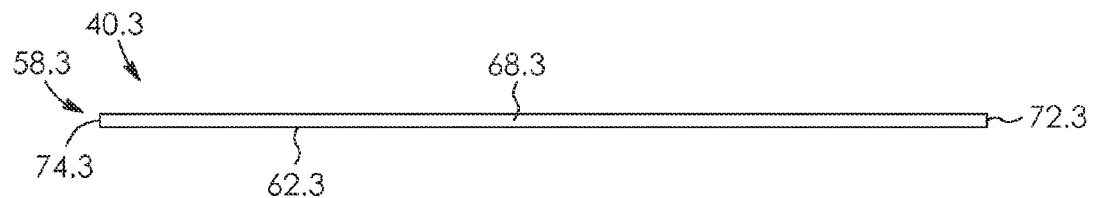
FIG. 28 is a top plan view of the adapter assembly of FIG. 24, with the bottom plan view being a mirror image thereof.

As seen in FIG. 23, bracket 44.2 comprises two spaced-apart portions 131 and 133 which are part of a light assembly 135 of the vehicle, in this example a trailer. Light assemblies for trailers, including their various parts and functionings, are known per se and therefore will not be described in detail.

Figure 18:
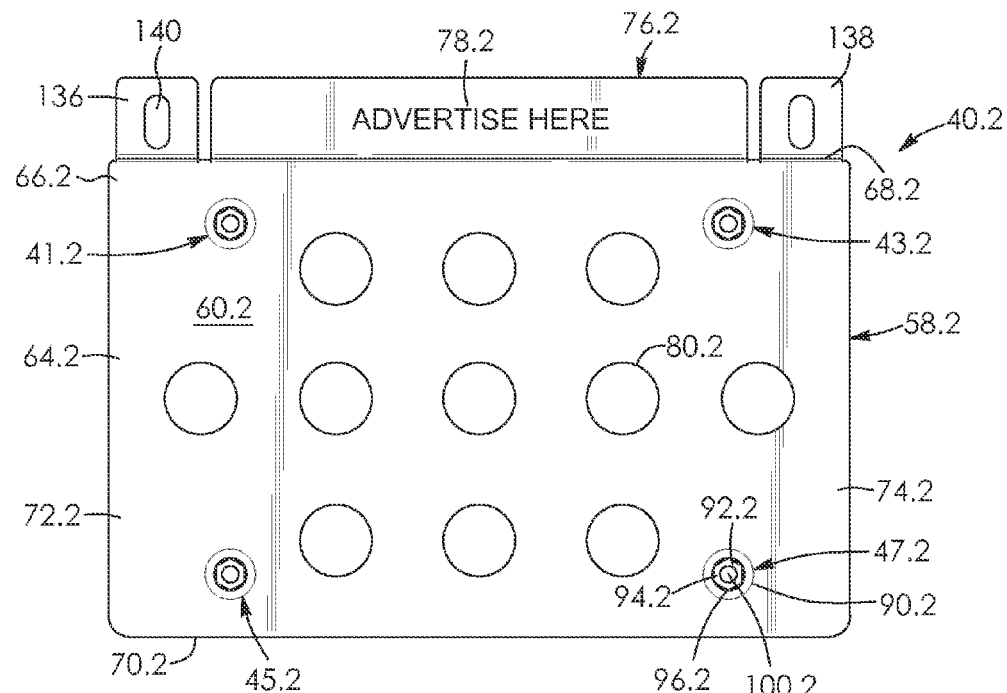
FIG. 18 is a front elevation view of an adapter plate assembly according to a second aspect.
Figure 19:
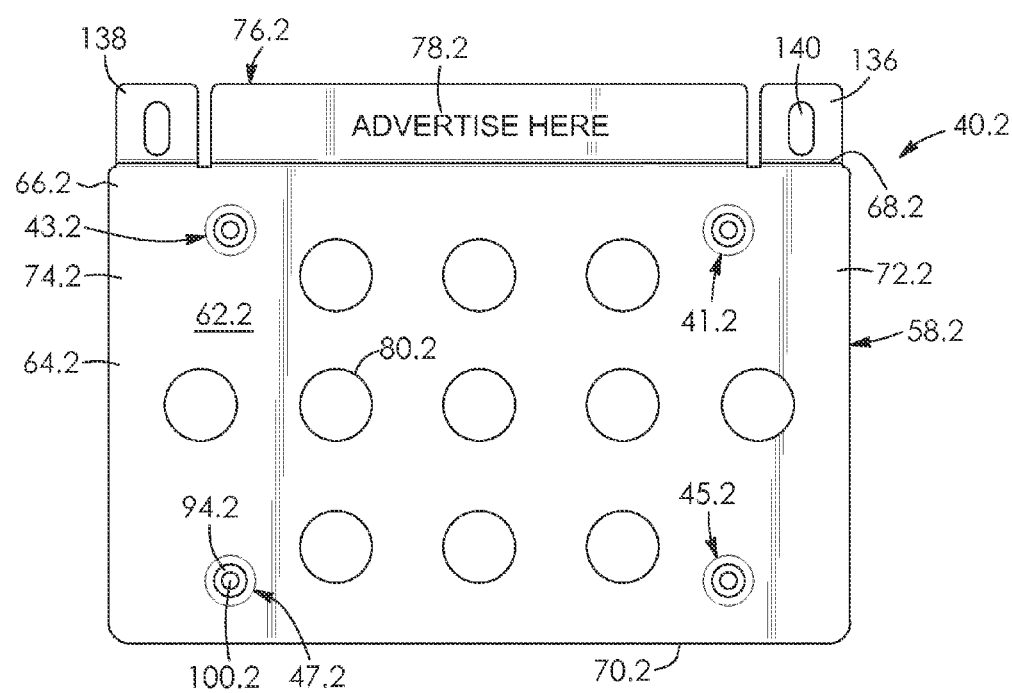
FIG. 19 is a rear elevation view thereof.
Figure 20:
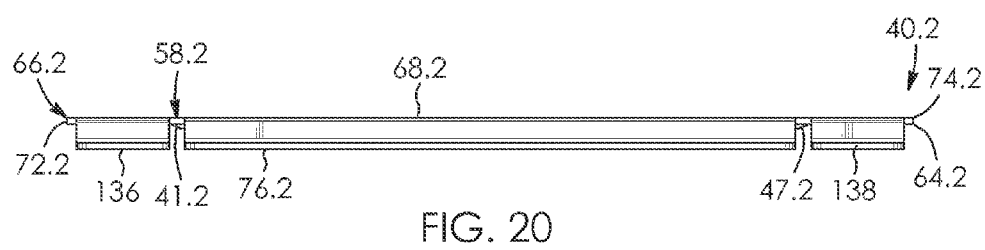
FIG. 20 is a top plan view thereof.
Figure 21:
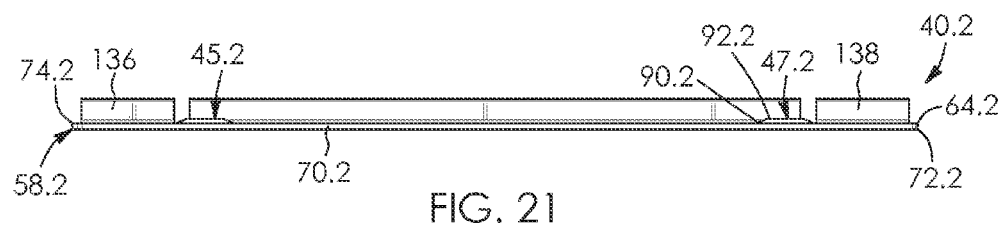
FIG. 21 is bottom plan view thereof.
Figure 22:
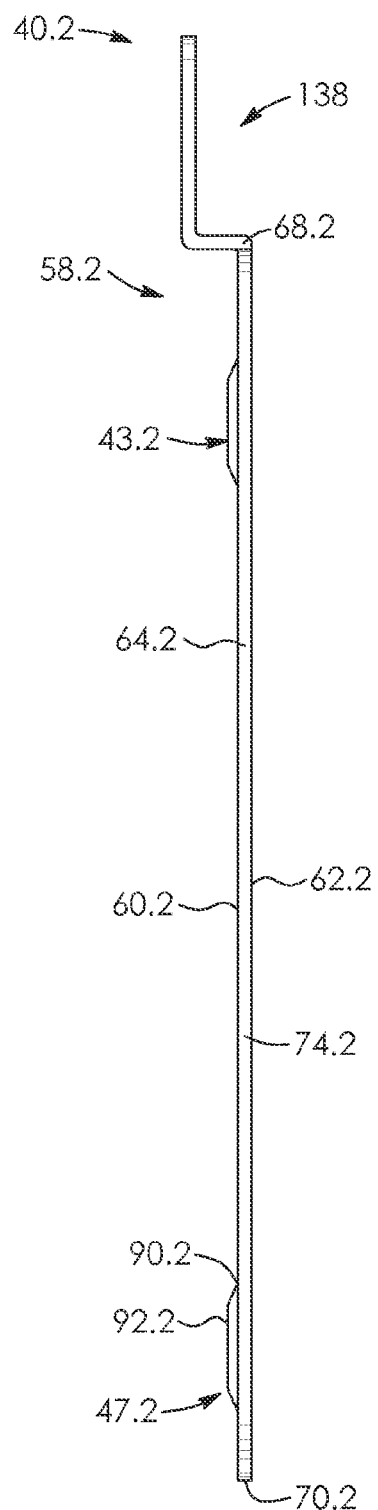
FIG. 22 is a right side view of the adapter plate assembly of FIG. 18, with the left side view being a mirror image thereof.

As seen in FIG. 18, the assembly 40.2 includes a pair of connector tabs 136 and 138 which are coupled to, extend along, and extend outwards from the top 68.2 of the plate 58.2. Each of the connector tabs is rectangular in front profile in this example and is in the form of an L-shaped bracket, with the bracket being L-shaped in side profile as seen in FIG. 22. Each connector tab has a peripheral aperture extending therethrough, as seen by aperture 140 for tab 136. The apertures 140 align with respective peripheral apertures 56.2 of the portions 131 and 133 of bracket 44.2. The adapter plate assembly 40.2 couples to the bracket via fasteners 87.2 which selectively extend through these apertures.

Referring to FIG. 18, the L-shaped form of the connector tabs 136 and 138 enables the tabs 136 and 138 to be angled relative to the front 60.2 of the license plate 42.2 seen in FIG. 23. The connector tabs are configured to be selectively bendable, to permit adjustment of the position of the front of the adapter plate relative to the bracket.

Display tab 76.2 extends from the top 68.2 of the adapter plate 58.2 in this example and is interposed between connector tabs 136 and 138 and portions 131 and 133 of bracket 44.2.

FIGS. 24 to 31 show an adapter plate assembly 40.3 according to a third aspect. Like parts have like numbers and functions as the adapter plate assembly 40 shown in FIGS. 1 to 16 with the addition of decimal extension ".3". Adapter plate assembly 40.3 is substantially the same as adapter plate assembly 40 shown in FIGS. 1 to 16 with the following exceptions.

Each of the protrusions 41.3, 43.3, 45.3 and 47.3 is in the shape of a rectangular prism in this example.

Figure 31:
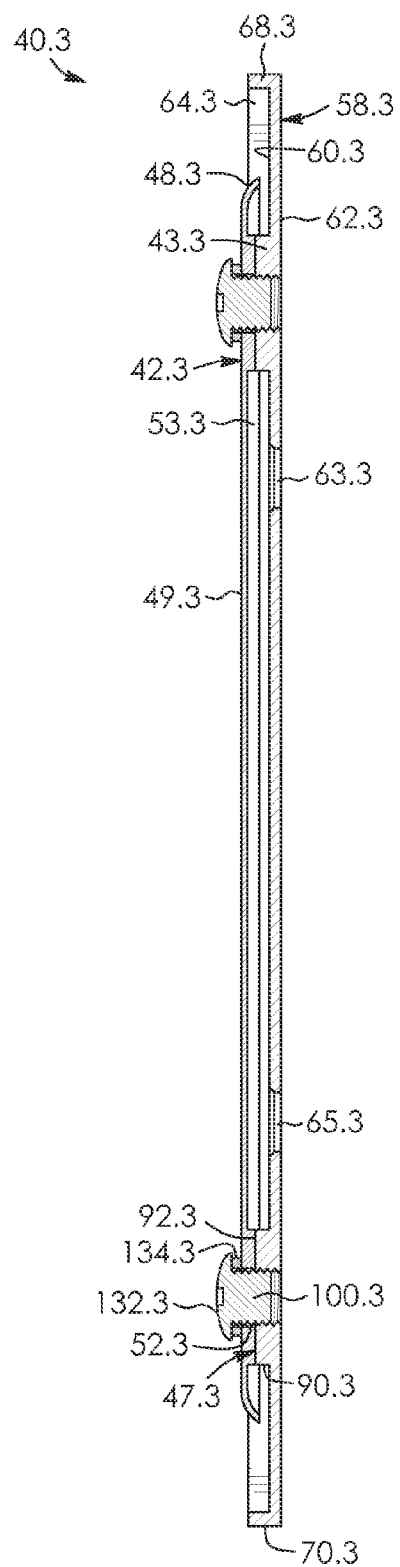
FIG. 31 is a side elevation, cross-sectional view of the adapter plate assembly of FIG. 19, together with a license plate connected thereto.

The adapter plate 58.3 has a recessed portion 142 which receives the license plate 42.3, as seen in FIG. 31. The recessed portion is defined by top 68.3, bottom 70.3, and sides 72.3 and 74.3 of the plate, each of which extends upwards from front 60.3 of the plate. The recessed portion 142 is sized to receive the license plate therewithin, as seen in FIG. 31. The peripheral portion rim 64.3 of the plate is thus coupled to and extends outwards from the front of the plate. The peripheral rim portion is shaped to extend around and partially enclose the license plate 42.3, as seen in FIG. 31.

The adapter plate 58.3, with its protrusions, in this example may be formed by milling out a recessed portion of the metal sheet.

Figure 29:
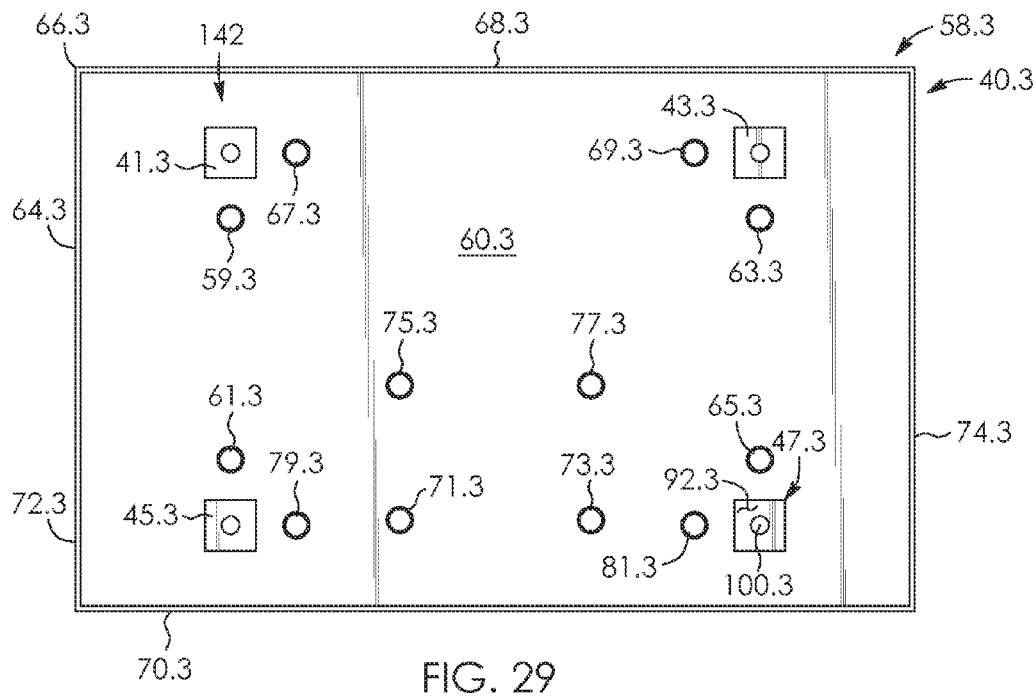
FIG. 29 is a front elevation view of the adapter plate assembly of FIG. 24.
Figure 30:
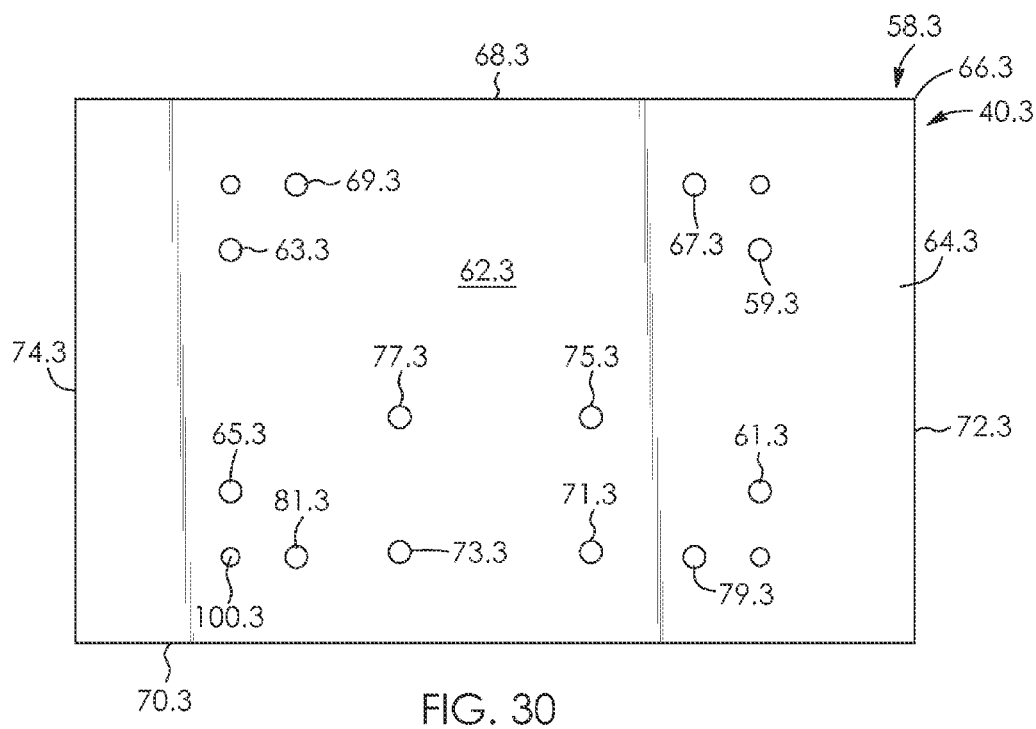
FIG. 30 is a rear elevation view thereof.

In this embodiment, apertures 71.3 and 73.3 substantially align with apertures 79.3 and 81.3, protrusions 45.3 and 47.3, and bottom 70.3 of plate 58.3, as seen in FIG. 29.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. An adapter plate assembly for mounting a license plate to a connector portion of a vehicle, the license plate having a recessed rear and a plurality of spaced-apart outer apertures extending therethrough adjacent to corners thereof, the connector portion having a plurality of peripheral apertures, and the assembly comprising:
   a rectangular adapter plate including a plurality of spaced-apart protrusions adjacent to respective corners thereof, the protrusions being embossments of the adapter plate, the protrusions being configured to abut and support the recessed rear of the license plate, the adapter plate having a plurality of outer apertures each of which extending through a respective one of the protrusions, the outer apertures of the adapter plate aligning with the outer apertures of the license plate, and the adapter plate having a pair of sides and a top; and
   an L-shaped bracket integrally coupled to and formed with, extending along and extending outwards from the top of the plate, the L-shaped bracket having portions thereof which align with respective ones of the sides of the adapter plate, align with one another, and extend between the sides of the adapter plate, each said portion of the L-shaped bracket having a peripheral aperture extending therethrough, the peripheral apertures of the portions of the L-shaped bracket being located on parts of the L-shaped bracket above the adapter plate, the peripheral apertures of the portions of the L-shaped bracket aligning with respective one of the peripheral apertures of the connector portion, whereby a plurality of fasteners are insertable through respective ones of the outer apertures and the peripheral apertures to enable the license plate to couple to the adapter plate and the adapter plate to couple to the connector portion of the vehicle thereby.

2. The assembly as claimed in claim 1 wherein the protrusions are frustoconical in shape.

3. The assembly as claimed in claim 1 wherein the adapter plate has a front that faces the license plate, the front of the adapter plate having a cross-sectional area substantially equal to or greater than that of the license plate.

4. The assembly as claimed in claim 1, the license plate having a peripheral rim portion spaced-apart from the recessed rear thereof, wherein the adapter plate has a peripheral portion, and wherein the protrusions are shaped such that when distal ends thereof abut the recessed rear of the license plate, the peripheral portion of the adapter plate abuts and aligns with the peripheral rim portion of the license plate.

5. The assembly as claimed in claim 1 wherein the bracket is configured to be selectively bendable, positioning of the adapter plate thus being adjustable relative to the connector portion.

6. The assembly as claimed in claim 1, wherein each of the protrusions has a proximal end coupled to and adjacent to the front of the adapter plate, and wherein each of the protrusions has a distal end spaced-apart from its proximal end and spaced-apart from the front of the adapter plate.

7. The assembly as claimed in claim 1 wherein the adapter plate is made of sheet metal.

8. The assembly as claimed in claim 1 wherein the bracket is L-shaped in side profile.

9. The assembly as claimed in claim 1 wherein the bracket is rectangular in front profile.

10. In combination, a plurality of fasteners and the assembly as claimed in claim 1.

11. In combination, a license plate and the assembly as claimed in claim 1.

12. In combination, a vehicle and the assembly as claimed in claim 1.

13. A process for forming the adapter plate of claim 1, the process comprising:
   pressing a plurality of female threaded connectors into a substantially rectangular metal sheet at locations corresponding to respective ones of the apertures of the license plate, each of the connectors being pressed between a male member having a frustoconical portion and a female member having a recess shaped to receive the frustoconical portion.

* * * * *